US012683248B2

(12) United States Patent
Pak et al.

(10) Patent No.: US 12,683,248 B2
(45) Date of Patent: Jul. 14, 2026

(54) BATTERY PACK

(71) Applicant: SK ON CO., LTD., Seoul (KR)

(72) Inventors: Byeong Jun Pak, Daejeon (KR); Min Song Kang, Daejeon (KR); Jun Hee Jung, Daejeon (KR); Sei Hoon Cho, Daejeon (KR); Jin Su Han, Daejeon (KR); Jae Il Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 654 days.

(21) Appl. No.: 17/931,037

(22) Filed: Sep. 9, 2022

(65) Prior Publication Data

US 2023/0073204 A1 Mar. 9, 2023

(30) Foreign Application Priority Data

Sep. 9, 2021 (KR) ........................ 10-2021-0120491

(51) Int. Cl.
| | |
|---|---|
| H01M 50/503 | (2021.01) |
| H01M 50/211 | (2021.01) |
| H01M 50/258 | (2021.01) |

(52) U.S. Cl.
CPC ....... H01M 50/503 (2021.01); H01M 50/211 (2021.01); H01M 50/258 (2021.01)

(58) Field of Classification Search
CPC ....... H01M 50/20; H01M 50/204–211; H01M 50/233; H01M 50/244; H01M 50/258; H01M 50/50–512
See application file for complete search history.

(56) References Cited

U.S. PATENT DOCUMENTS

| | | |
|---|---|---|
| 11,901,530 B2 | 2/2024 | Lee et al. |
| 2005/0214638 A1 | 9/2005 | Asahina et al. |
| 2011/0003193 A1 | 1/2011 | Park et al. |
| 2011/0300433 A1 | 12/2011 | Kim |
| 2012/0280692 A1 | 11/2012 | Park |
| 2012/0328920 A1 | 12/2012 | Takase et al. |
| 2014/0017553 A1* | 1/2014 | Kikuchi .............. H01M 50/507 429/159 |
| 2018/0194235 A1* | 7/2018 | Kim ........................ B60L 50/50 |

(Continued)

FOREIGN PATENT DOCUMENTS

| | | |
|---|---|---|
| CN | 109390506 A | 2/2019 |
| CN | 213243054 U | 5/2021 |

(Continued)

OTHER PUBLICATIONS

Machine translation of Goh, DE 102019134469. Originally available Jul. 2, 2020. (Year: 2020).*

(Continued)

*Primary Examiner* — Nicole M. Buie-Hatcher
*Assistant Examiner* — Jacob Buchanan
(74) *Attorney, Agent, or Firm* — Perkins Coie LLP

(57) ABSTRACT

A battery pack includes a plurality of battery assemblies, each of the plurality of battery assemblies including a cell stack that includes a plurality of battery cells stacked together and a plate unit covering at least a portion of a side surface of the cell stack, and a linking member configured to electrically connect at least two of the battery assemblies to each other, wherein the plate unit may include an accommodation portion into which the linking member is inserted.

12 Claims, 9 Drawing Sheets

(56) References Cited

U.S. PATENT DOCUMENTS

| | | | |
|---|---|---|---|
| 2018/0269443 A1* | 9/2018 | Takahashi | H01M 50/262 |
| 2019/0198849 A1* | 6/2019 | Nakayama | H01M 50/507 |
| 2019/0296309 A1 | 9/2019 | Yang et al. | |
| 2019/0305282 A1 | 10/2019 | Jeon | |
| 2020/0127258 A1* | 4/2020 | Lim | H01M 10/625 |
| 2020/0259152 A1* | 8/2020 | Lee | H01M 50/50 |
| 2021/0135175 A1 | 5/2021 | An et al. | |
| 2022/0077519 A1 | 3/2022 | An et al. | |
| 2022/0094003 A1 | 3/2022 | Jo et al. | |
| 2022/0181747 A1* | 6/2022 | Yanagida | H01M 50/505 |
| 2022/0263183 A1 | 8/2022 | Chi et al. | |

FOREIGN PATENT DOCUMENTS

| | | | | |
|---|---|---|---|---|
| DE | 102019134469 A1 * | 7/2020 | | H01M 10/486 |
| EP | 3651236 A1 | 5/2020 | | |
| JP | 2011-210710 A | 10/2011 | | |
| JP | 2018-110082 A | 7/2018 | | |
| JP | 2018-156825 A | 10/2018 | | |
| KR | 10-2011-0002355 A | 1/2011 | | |
| KR | 10-2011-0133807 A | 12/2011 | | |
| KR | 10-2013-0036669 A | 4/2013 | | |
| KR | 10-2019-0110402 A | 9/2019 | | |
| KR | 10-2020-0044578 A | 4/2020 | | |
| KR | 10-2020-0097510 A | 8/2020 | | |
| KR | 10-2209824 B1 | 1/2021 | | |
| KR | 10-2021-0053053 A | 5/2021 | | |
| KR | 10-2271377 B1 | 6/2021 | | |
| KR | 10-2022-0031226 A | 3/2022 | | |
| KR | 10-2022-0040895 A | 3/2022 | | |
| WO | WO-2020241412 A1 * | 12/2020 | | H01R 9/24 |
| WO | 2021/025470 A1 | 2/2021 | | |

OTHER PUBLICATIONS

Extended European Search Report for European Patent Application No. 22192747.8, mailed Feb. 13, 2023 (7 pages).
Notice of Allowance for Korean Patent Application No. 10-2024-0055663, mailed May 18, 2026 (2 pages).

* cited by examiner

BATTERY PACK

CROSS-REFERENCE TO RELATED APPLICATION(S)

This application claims benefit of priority to Korean Patent Application No. 10-2021-0120491 filed in the Korean Intellectual Property Office on Sep. 9, 2021, the disclosure of which is incorporated herein by reference in its entirety.

TECHNICAL FIELD

The present disclosure relates to a battery pack including a battery assembly in which a plurality of battery cells are stacked.

BACKGROUND

Unlike primary batteries, secondary batteries may be charged and discharged, and thus may be applied to various devices such as digital cameras, mobile phones, notebook computers, hybrid vehicles, and electrical vehicles. Among secondary batteries, lithium secondary batteries having high energy density and a high discharge voltage are being widely used. Such lithium secondary batteries are manufactured as pouch-type battery cells having flexibility, prismatic battery cells having rigidity, or cylindrical can-type battery cells.

SUMMARY

The disclosed technology can be implemented in some embodiments to provide a battery pack having increased space utilization and improved energy density.

A cell stack includes a plurality of battery cells electrically connected to each other. The cell stack is accommodated in a module housing to form a battery module, and a pack housing includes a plurality of battery modules accommodated therein to form a battery pack, which can be installed and used in an electric vehicle or others. When the battery pack accommodates a plurality of battery modules, and each battery module has a shape surrounding the entire exterior surface including upper and lower surfaces of the cell stack, an increased space occupied by the battery module inside the pack housing may lower the energy density of the battery pack.

According to an aspect of the present disclosure, a battery pack can include a plurality of battery assemblies, each of the plurality of battery assemblies including a cell stack in which a plurality of battery cells are stacked and a plate unit covering at least a portion of a side surface of the cell stack and a linking member electrically connecting at least two of the battery assemblies, wherein the plate unit may include an accommodation portion into which the linking member is inserted.

The accommodation portion may be formed as a recess exposed to an upper surface of the plate unit.

The linking member may include a connection member formed in a rod shape and inserted into the accommodation portion and a terminal coupling portion extending from both ends of the connection member and coupled to a connection terminal of the battery assembly.

The connection member may be formed in a flat rod shape and may be inserted into the accommodation portion so that a first surface (e.g., wide surface) thereof faces the cell stack.

The battery pack may further include: a pack housing accommodating the battery assemblies and the linking member, wherein the pack housing includes a sidewall portion forming an internal space and a partition member dividing the internal space into a plurality of spaces, and the battery assemblies may be housed in the plurality of spaces respectively.

The linking member may be disposed to cross the partition member, and the partition member may include a crossing recess into which the linking member is inserted.

The linking member may further include a spacer member, and the spacer member may be coupled to the crossing recess to separate the linking member from the partition member by a predetermined distance.

The spacer member may be formed of an insulating material, and the connection member may pass through the spacer member to be coupled to the spacer member.

The spacer member may include at least one of a resin, a ceramic, and a rubber.

The accommodation portion may be provided in a portion of the plate unit facing the sidewall portion.

At least a portion of the plate unit may be disposed between the connection member and the sidewall portion.

The plate unit may include two first plates coupled to two of the four sides of the cell stack facing each other and two second plates coupled to the other two of the four sides, wherein the first plate may be disposed to face an electrode lead of the battery cell.

The two second plates may be disposed to be parallel to the battery cells, and the accommodation portion may be formed on at least one of the two second plates.

The plurality of battery assemblies may be disposed such that the first plates face each other, and the linking member may be disposed to be parallel to the second plate.

According to another aspect of the present disclosure, a battery pack can include a plurality of battery assemblies, each of the plurality of battery assemblies including a cell stack in which a plurality of battery cells are stacked and a plate unit covering at least a portion of a side surface of the cell stack, a linking member electrically connecting at least two of the battery assemblies, and a pack housing accommodating the battery assemblies and the linking member therein, wherein at least a portion of the plate unit is disposed between the linking member and the pack housing to insulate the pack housing from the linking member.

At least a portion of the plate unit may be disposed between the linking member and the cell stack to insulate the cell stack from the linking member.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
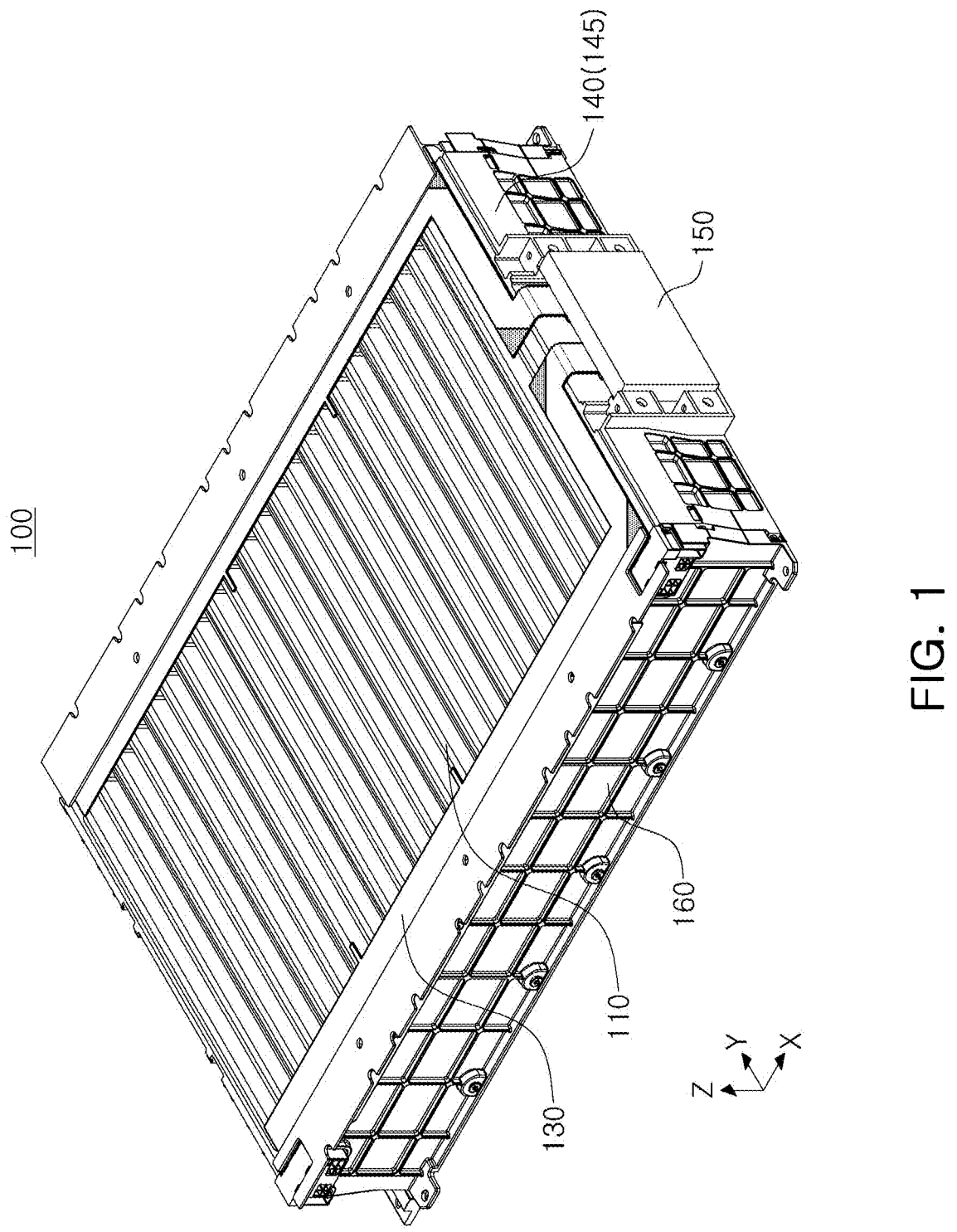
FIG. 1 is a perspective view of a battery assembly according to an exemplary embodiment in the present disclosure.

Prior to the description of the present disclosure, terms and words used in the present specification and claims to be described below should not be construed as limited to ordinary or dictionary terms, and should be construed in accordance with the technical idea of the present disclosure based on the principle that the inventors can properly define their own inventions in terms of terms in order to best explain the invention. Therefore, the exemplary embodiments described in the present specification and the configurations illustrated in the drawings are merely the most preferred exemplary embodiments of the present disclosure and are not intended to represent all of the technical ideas of the present disclosure, and thus should be understood that various equivalents and modifications may be substituted at the time of the present application.

Hereinafter, preferred exemplary embodiments of the present disclosure will be described in detail with reference to the accompanying drawings. In this case, in the drawings, the same components are denoted by the same reference symbols as possible. Further, the detailed description of well-known functions and constructions which may obscure the gist of the present disclosure will be omitted. For the same reason, some of the elements in the accompanying drawings are exaggerated, omitted, or schematically illustrated, and the size of each element does not entirely reflect the actual size.

Figure 2:
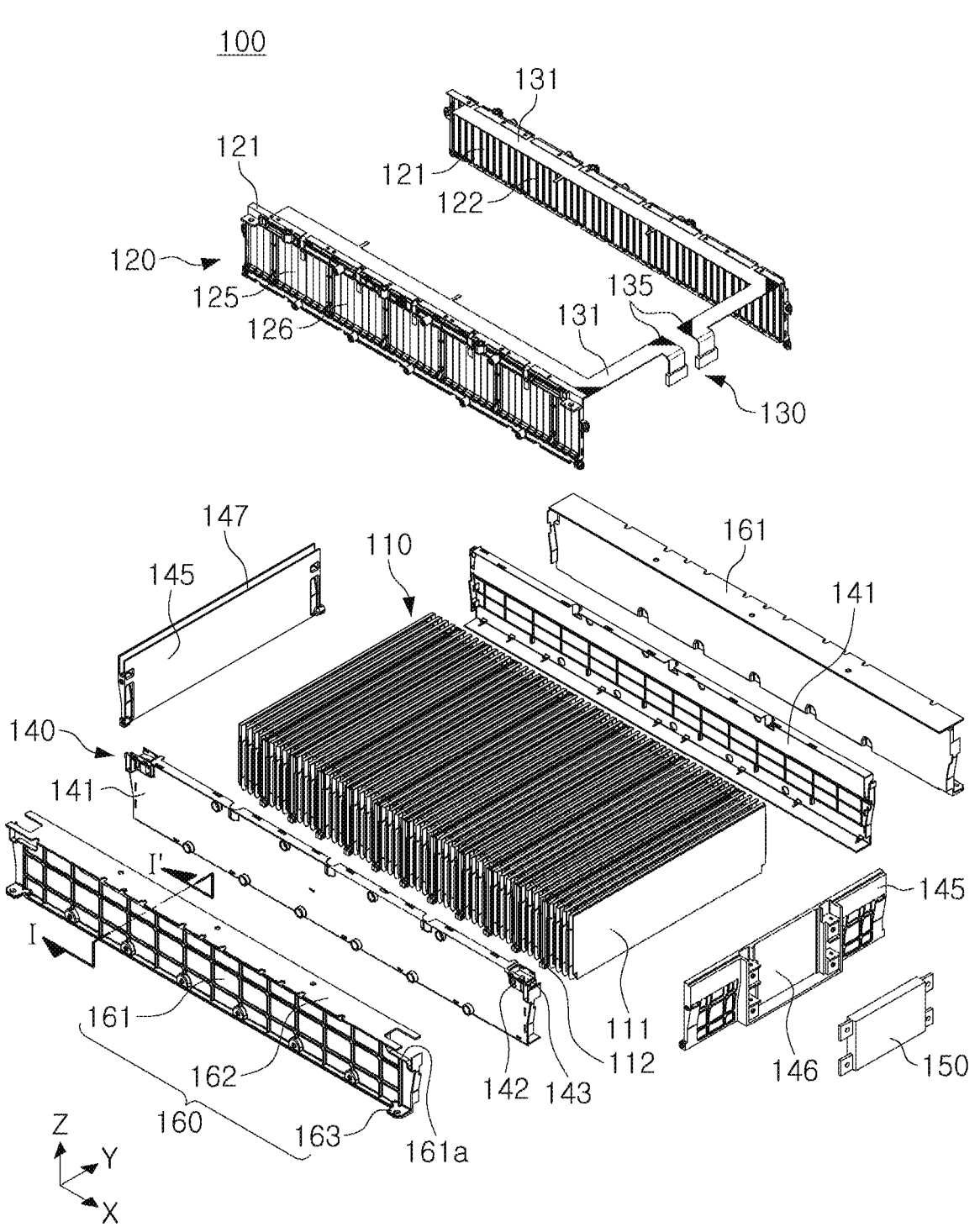
FIG. 2 is an exploded perspective view of the battery assembly illustrated in FIG. 1.
Figure 3:
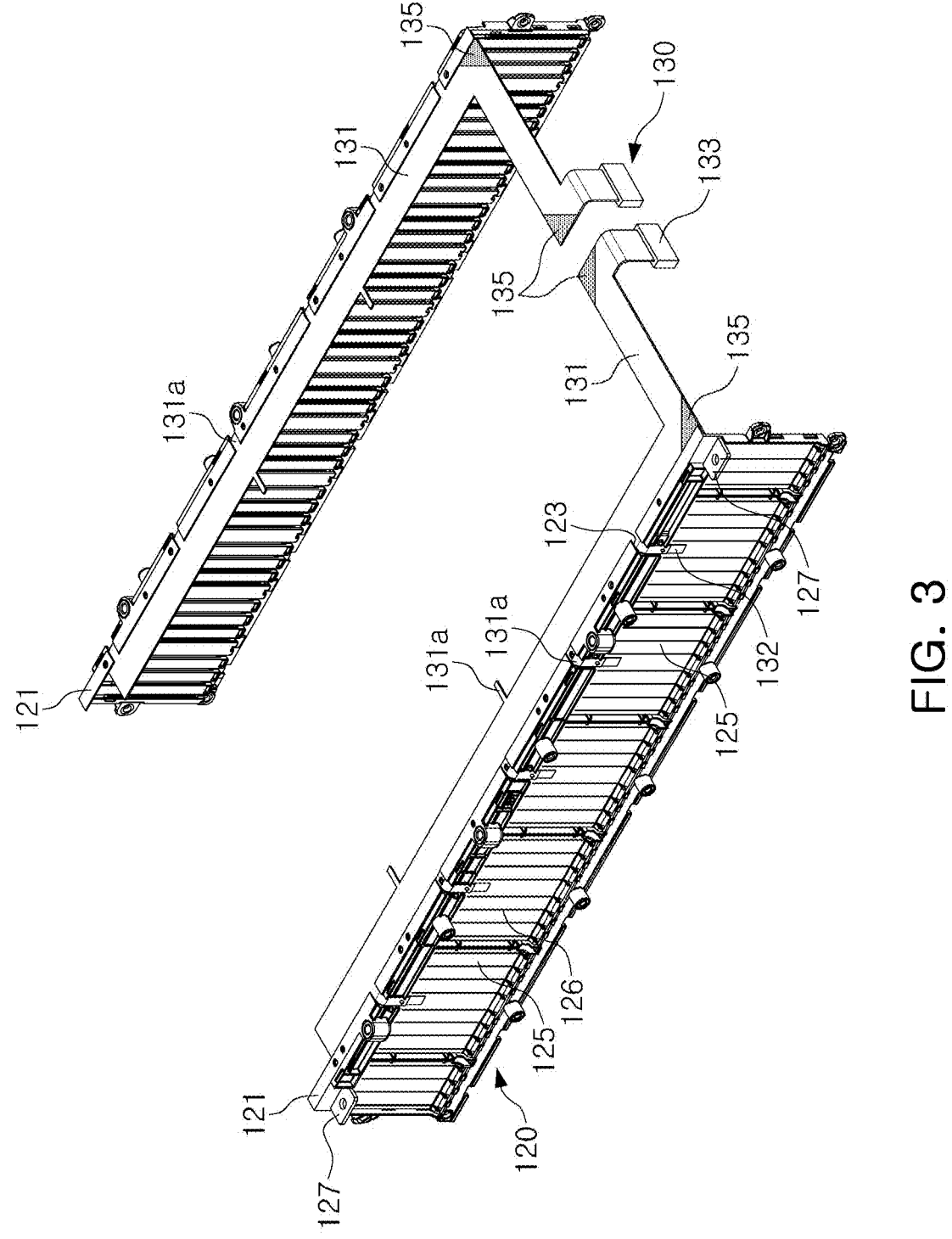
FIG. 3 is an enlarged perspective view of a busbar assembly and a sensing unit illustrated in FIG. 2.

FIG. 1 is a perspective view of a battery assembly according to an exemplary embodiment in the present disclosure, FIG. 2 is an exploded perspective view of the battery assembly illustrated in FIG. 1, and FIG. 3 is an enlarged perspective view of a busbar assembly and a sensing unit illustrated in FIG. 2.

Referring to FIGS. 1 to 3, a battery assembly 100 according to the exemplary embodiment in the present disclosure may include a cell stack 110 in which a plurality of battery cells 111 are stacked, a busbar assembly 120 coupled to the cell stack 110, a plate unit 140 configured to cover at least a portion of a side surface of the cell stack 110, a sensing unit 130 connected to the busbar assembly 120, and a cell monitoring unit 150. In addition, the battery assembly 100 according to an exemplary embodiment in the present disclosure may include a bracket member 160 coupled to an exterior surface of the plate unit 140.

The cell stack 110 forms a member in which a plurality of battery cells 111 are stacked. The battery cells 111 are stacked with wide surfaces thereof in contact with each other, and the neighboring battery cells 111 may be fixed through double-sided tape. The cell stack 110 may be stacked in a horizontal direction (X-axis direction) with the battery cells 111 with wide surfaces thereof in contact with each other, but a stacking direction is not limited thereto.

The battery cell 111 provided in the cell stack 110 may be formed of a pouch-type secondary battery. The battery cell 111 formed of a pouch-type secondary battery may be configured in a form in which an electrode assembly and an electrolyte are accommodated in a casing (pouch). The electrode assembly may be configured in a form in which the positive and negative electrode plates are stacked with a separator interposed therebetween in a state in which wide surfaces of the positive and negative electrode plates face each other. An electrode tab may be connected to each of the positive electrode plate and the negative electrode plate, and electrode tabs of the same polarity may be connected to an electrode lead 112 and exposed externally of the casing. The electrode leads 112 may be respectively disposed at both ends of the battery cell 111 in a length direction (a Y-axis direction), but a plurality of electrode leads 112 having different heights may be disposed at one end of the battery cell 111.

The battery cell 111 may be formed of a nickel metal hydride (Ni-MH) battery or a lithium ion (Li-ion) battery that may be chargeable and dischargeable. In the above, a case in which a pouch-type secondary battery is used as the battery cell 111 has been described as an example, but in an exemplary embodiment in the present disclosure, the battery cell 111 provided in the battery assembly 100 is not limited to the pouch-type secondary battery described above and may be configured as a can-type secondary battery. The can-type secondary preposition may have a quadrangular cross-section so as to be stacked to form the cell stack 110.

The busbar assembly 120 may include a busbar 125 electrically connected to the electrode lead 112 of the battery cell 111, and may be coupled to the cell stack 110. The busbar 125 may be formed of an electrically conductive material to implement a series and parallel electrical connection structure of the battery cells 111. The electrode lead 112 may be exposed to the outside of the busbar 125 through a coupling hole 126 formed to pass through the busbar 125. The electrode lead 112 may be welded to the busbar 125 in a state in which the electrode lead 112 passes through the coupling hole 126. When the electrode leads 112 of the battery cell 111 are disposed at both ends in the length direction (the Y-axis direction) of the battery cell 111, the busbar assembly 120 may be disposed at each of both ends of the battery cell 111 in the length direction (Y-axis direction).

The busbar assembly 120 may include an insulating support plate 121 on which the busbar 125 is supported and installed. The support plate 121 may be positioned between the busbar 125 and the battery cell 111 for insulation between the busbar 125 and the battery cell 111. The support plate 121 may have a through-hole 122 through which the electrode lead 112 may pass. The electrode lead 112 may be coupled to the coupling hole 126 of the busbar 125, in a state of passing through the through-hole 122 of the support plate 121, and the busbar assembly 120 may be coupled to the cell stack 110.

The plate unit 140 is configured to cover at least a portion of a side surface of the cell stack 110 to protect the side surface of the cell stack 110 from the outside. The plate unit 140 surrounds four side surfaces of the cell stack 110 and may have a shape such that at least a portion of an upper surface and a lower surface of the cell stack 110 are exposed externally.

As an example, the plate unit 140 may include a first plate 141 covering the cell stack 110 in the length direction (the Y-axis direction) of the battery cells 111 and a second plate 145 covering the cell stack 110 in a stacking direction (an X-axis direction) of the battery cell 111.

Accordingly, two first plates 141 may be coupled to two of the four side surfaces of the cell stack 110 facing each other, and two second plates 145 may be coupled to the other two of the four side surfaces.

In this case, the busbar assembly 120 may be positioned between the first plate 141 and the cell stack 110. Accordingly, the first plate 141 may be disposed to face the electrode lead 112 of the battery cell 111 to protect the busbar assembly 120. In addition, the two second plates 145 may be disposed to be parallel to the battery cell 111.

Although not illustrated in detail, at least some of the first plate 141 and the second plate 145, the first plate 141 and the busbar assembly 120, and the second plate 145 and the busbar assembly 120 may be fastened to each other by known fastening means such as bolts.

The second plate 145 may be configured to be coupled to the busbar assembly 120 to maintain a gap (i.e., a gap in the Y-axis direction) between the cell stack 110 and the busbar assembly 120. Accordingly, stable coupling between the electrode lead 112 of the battery cell 111 and the busbar 125 may be maintained. In order to fasten the first plate 141, the second plate 145, and the busbar assembly 120, an assembly hole (reference numeral is not given) may be formed in the first plate 141, the second plate 145, and the busbar assembly 120. In this manner, by coupling the cell stack 110 and the busbar assembly 120 and coupling the first plate 141, the second plate 145, and/or the busbar assembly 120 to each other, the battery assembly 100 may be formed as a single structure.

In some implementations, the plate unit 140 may be configured to cover both surfaces (both side surfaces of the cell stack 110 in the X-axis direction in FIG. 2) on which the busbar assembly 120 is not provided in the side surfaces of the cell stack 110, and may not be installed on both surfaces (both side surfaces of the cell stack 110 in the Y-direction in FIG. 2) on which the busbar assembly 120 is provided. In this case, among the four side surfaces of the cell stack 110, two side surfaces of the battery cell 111 in the stacking direction X may be covered by the plate unit 140, and two side surfaces of the battery cell 111 in the length direction (the Y-axis direction) may be covered by the busbar assembly 120. That is, in the exemplary embodiment in the present disclosure, the four side surfaces of the cell stack 110 may be changed to a structure surrounded and protected by the plate unit 140 and the busbar assembly 120.

In some implementations, the plate unit 140 may include a venting hole 142 to discharge gas, flames, combustible materials, etc. discharged from the battery cell 111 externally of the cell stack 110. The pouch-type secondary battery may have a structure in which the battery cell 111 seals at least a portion of the periphery of the casing accommodating the electrode assembly to form a sealing portion (not illustrated) and to the sealing portion is folded to maintain sealing force. In this case, since the sealing portion in which the electrode lead 112 is disposed may not be folded and may have sealing force weaker than that of the folded portion, when an event such as a temperature rise, fire, or an explosion occurs inside the battery cell 111, gases, flames, combustible materials, etc., may be discharged through the sealing portion in which the electrode lead 112 is disposed.

The venting hole 142 formed in the first plate 141 may be formed in a position facing the electrode lead 112. Therefore, the gas, flames, combustible materials, etc. discharged from the cell stack 110 may be rapidly discharged in an outward direction of the cell stack 110 through the venting hole 142. However, the present disclosure is not limited thereto.

A terminal portion 143 supporting a connection terminal (127 in FIG. 3) may be installed on the first plate 141. The terminal portion 143 may be formed to support the connection terminal 127 from a lower portion of the connection terminal 127, and may be installed at both ends of the battery assembly 100 in a longer side direction. However, a position or shape of the terminal portion 143 is not limited thereto.

In addition, at least one of the plate units 140 of the present exemplary embodiment may include an accommodation portion 147. In the present exemplary embodiment, the accommodation portion 147 is provided on the second plate 145 to which the cell monitoring unit 150 is not coupled, among the two second plates 145. However, a configuration of the present disclosure is not limited thereto, and the accommodation portion 147 may be provided on another second plate 145 or on first plate 141 as necessary.

The accommodation portion 147 is a space into which a linking member (170 of FIG. 5), which will be described later, is inserted, and may be formed in the form of a recess exposed to an upper surface (a Z-direction) of the second plate 145.

For electrical insulation between the linking member 170 and a pack housing (210 of FIG. 4) to be described later, a portion of the linking member 170 as large as possible may be inserted and disposed in the accommodation portion 147. For example, the accommodation portion 147 may be formed to have a depth at which the connection member 171 constituting the linking member 170 does not protrude above the second plate 145.

The accommodation portion 147 may be formed to be elongated in a length direction of the second plate 145. Due to this, in FIG. 2, an upper portion of the second plate 145 in which the accommodation portion 147 is formed may be thicker than a lower portion thereof. For example, a portion of the plate unit 140 in which the accommodation portion 147 is formed may have a thickness increasing upwardly.

In the present exemplary embodiment, the connection member 171 may be formed to be longer than the second plate 145. Accordingly, the accommodation portion 147 may be formed to be exposed at both ends of the second plate 145.

Figure 5:
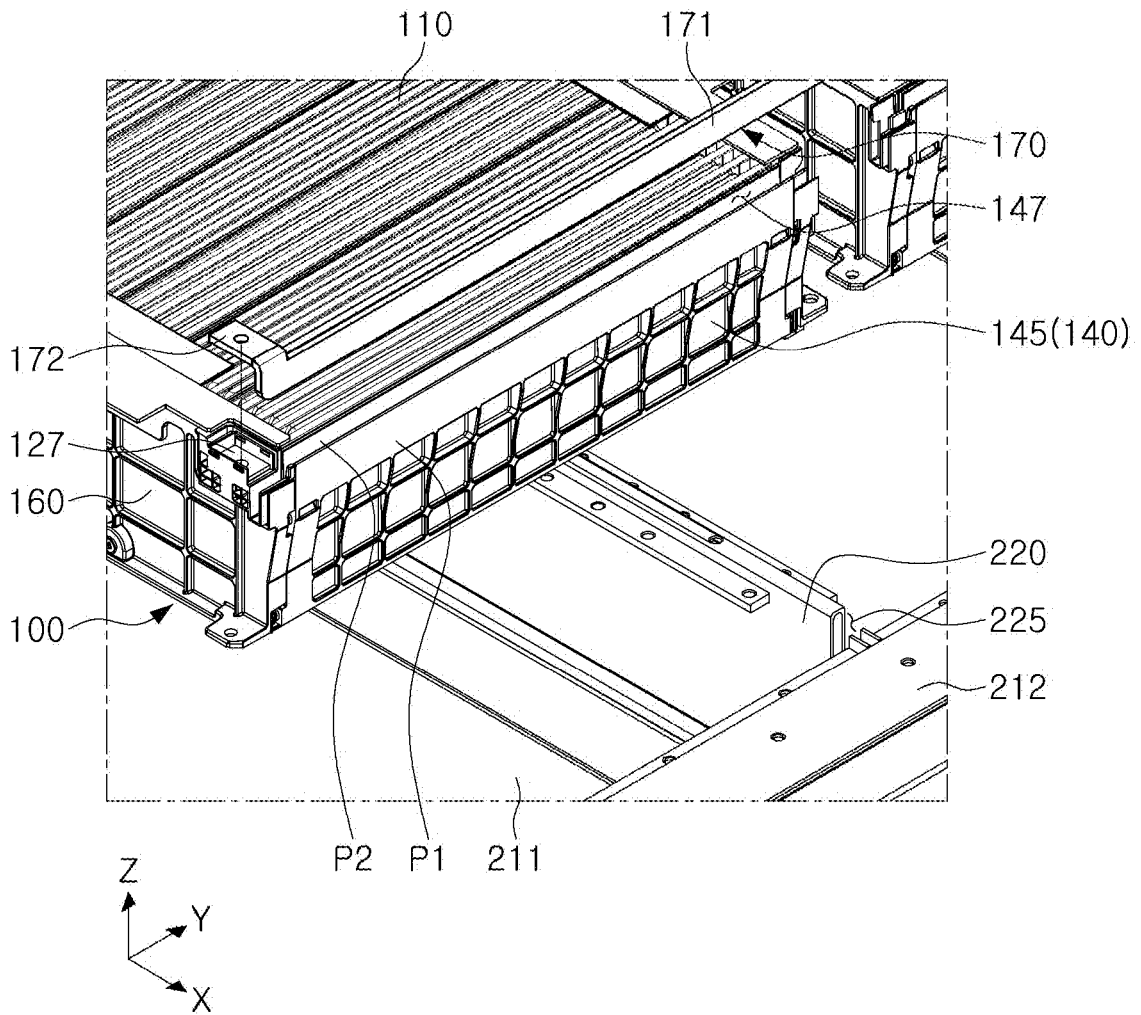
FIGS. 5 and 6 are partially exploded perspective views of FIG. 4.

Accordingly, as illustrated in FIG. 5, the linking member 170 may be positioned above the battery assembly 120 and then lowered so that the connection member 171 is inserted into the accommodation portion 147 and coupled to the battery assembly 100.

In the present exemplary embodiment, the connection member 171 inserted into the accommodation portion 147 may be formed of a conductive material. Therefore, in order to electrically insulate the connection member 171 from other elements, the second plate 145 on which the accommodation portion 147 is formed may be formed of an insulating material. For example, the plate unit 140 of the present exemplary embodiment may be entirely formed of an insulating material. However, the configuration of the present disclosure is not limited thereto, and if necessary, a portion of the plate unit 140 may be formed of a conductive material as necessary.

Also, as illustrated in FIG. 5, in an exemplary embodiment, the accommodation portion 147 is provided on the second plate 145 disposed to face the sidewall portion 212 of the plate unit 140. Accordingly, when the conductive connection member 171 is inserted and disposed in the accommodation portion 147, at least a portion P1 of the plate unit 140 may be disposed between the connection member 171 and the sidewall portion 212 to secure insulation between the connection member 171 and the sidewall portion 212. In this case, since at least a portion P2 of the plate unit 140 is also disposed between the linking member 170 and the cell stack 110, insulation between the linking member 170 and the cell stack 110 may also be secured.

The sensing unit 130 may be provided to measure a voltage or temperature of the battery cell 111. As illustrated in FIG. 3, the sensing unit 130 may include a voltage sensor 132 connected to the busbar 125 to measure a voltage of the battery cell 111 and a temperature sensor (not illustrated) installed on an exterior surface (e.g., an upper surface) of the battery cell 111 to measure a temperature of the battery cell 111. In addition, the sensing unit 130 may include a circuit member 131 to transmit a signal received from the voltage sensor 132, the temperature sensor, and the like. The circuit member 131 may be formed of a printed circuit board (PCB) or may include a flexible printed circuit board (FPCB) for ease of handling and installation and a reduction in thickness.

The circuit member 131 may be disposed on one surface of the cell stack 110, for example, an upper surface of the cell stack 110. In addition, in the present exemplary embodiment, the sensing unit 130 may include an insulating member 135 to insulate the circuit member 131 and the cell stack 110 from each other. The insulating member 135 may be provided in the form of a film or sheet having insulating properties and disposed between the circuit member 131 and the cell stack 110.

The voltage sensor 132 may be attached to the busbar 125 through welding or the like. To this end, the sensing unit 130 may include an extension portion 131a extending from the circuit member 131 toward the busbar 125. The extension portion 131a may extend toward the busbar 125 through a recess formed in the support plate 121, and a voltage sensor 132 may be disposed at an end of the extension portion 131a to be attached to the busbar 125. Meanwhile, the extension portion 131a may extend toward an upper surface of the cell stack 110, and a temperature sensor (not illustrated) may be installed in the extension portion 131a extending toward the upper surface of the cell stack 110.

The cell monitoring unit 150 may be connected to the sensing unit 130 to measure a temperature, voltage, etc. of the battery module based on information received from the voltage sensor 132 and/or the temperature sensor, etc., and transfer the measured temperature, voltage, etc. to a battery management system (BMS). The cell monitoring unit 150 may be installed in the plate unit 140. For example, a recess 146 for installation of the cell monitoring unit 150 may be formed in at least one of the second plates 145, and the cell monitoring unit 150 may be installed in the recess 145 of the second plate 145, in a state of being connected to a connector 133 of the sensing unit 130.

In an embodiment of the disclosed technology, the battery assembly 100 may further include a bracket member 160 coupled to an exterior surface of the plate unit 140, and the battery assembly 100 may be fixedly installed inside the pack housing (210 in FIG. 4) through the bracket member 160.

The bracket member 160 may be installed to correspond to all sides of the cell stack 110 or may be installed on a portion of the plate unit 140 to minimize the volume of the battery assembly 100 and improve assemblability. As an example, the bracket member 160 may be coupled to an exterior surface of the first plate 141 corresponding to the longer side of the cell stack 110.

In addition, if necessary, the bracket member 160 may be directly fastened to the busbar assembly 120 through a fastening member such as a bolt. In this case, the first plate 141 may have a through-hole (a reference numeral is not given) through which the fastening member passes, and the first plate 141 may be fixed between the bracket member 160 and the busbar assembly 120 by a fastening force between the bracket member 160 and the busbar assembly 120.

The bracket member 160 may include a support plate 161 having a wide surface facing the first plate 141 and an upper flange portion 162 provided at an upper end of the support plate 161. In addition, the bracket member 160 may include a lower flange portion 163 provided at a lower end of the support plate 161.

The bracket member 160 may reinforce rigidity of the battery assembly 100, and to this end, the bracket member 160 may be formed of a metal material. However, the present disclosure is not limited thereto, and various materials may be used within a range having rigidity similar to that of a metal. In addition, the battery assembly 100 may be fastened to the pack housing (210 of FIG. 4) to be described below through the bracket member 160. For example, the battery assembly 100 may be fixedly coupled to the pack housing 210 as the upper flange portion 162 and the lower flange portion 163 of the bracket member 160 are fastened to the pack housing 210. To this end, the bracket member 160 may have rigidity for fixing the battery assembly 100 to the pack housing 210.

Figure 4:
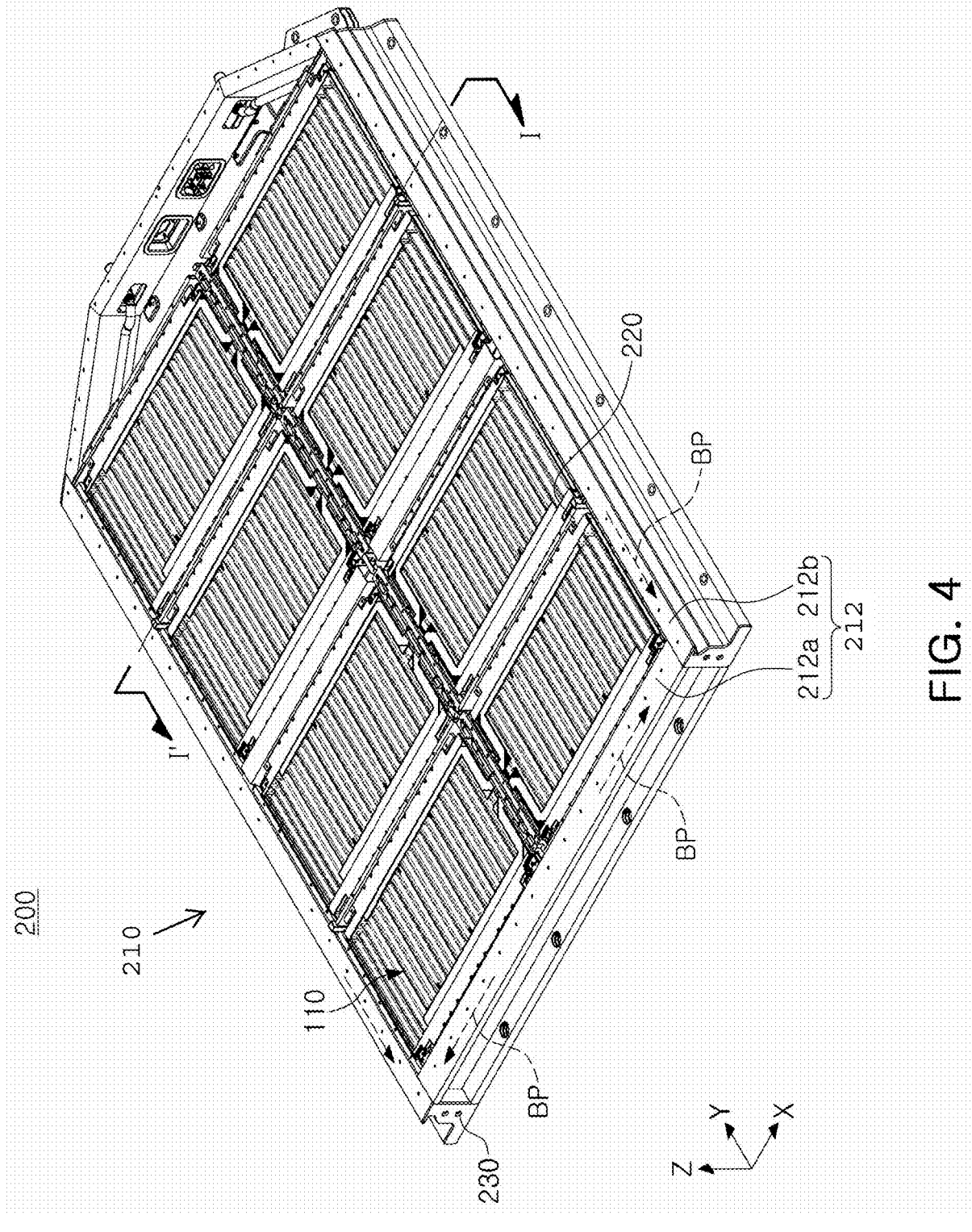
FIG. 4 is a perspective view of a battery pack having the battery assembly illustrated in FIG. 1.
Figure 6:
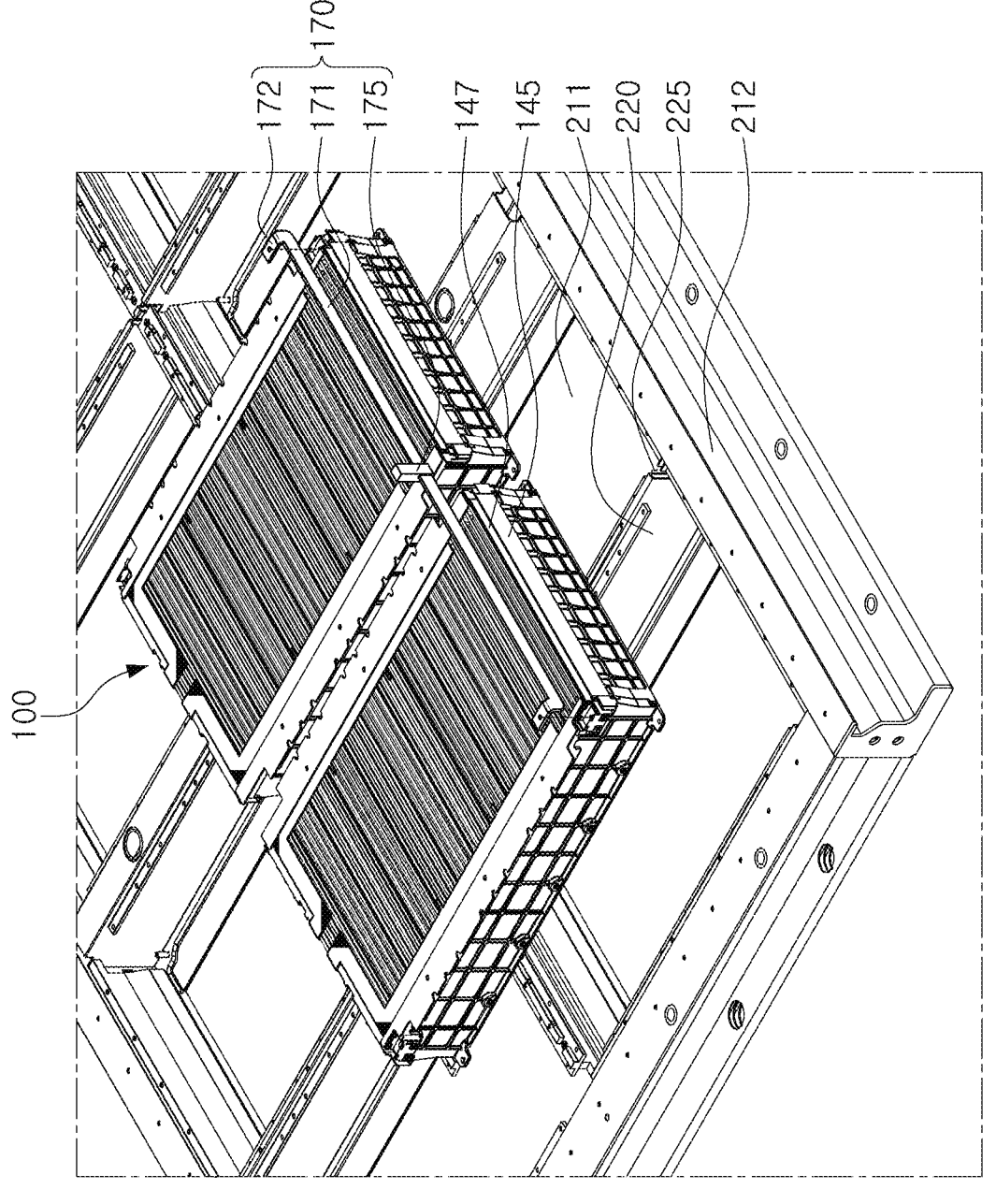
Figure 7:
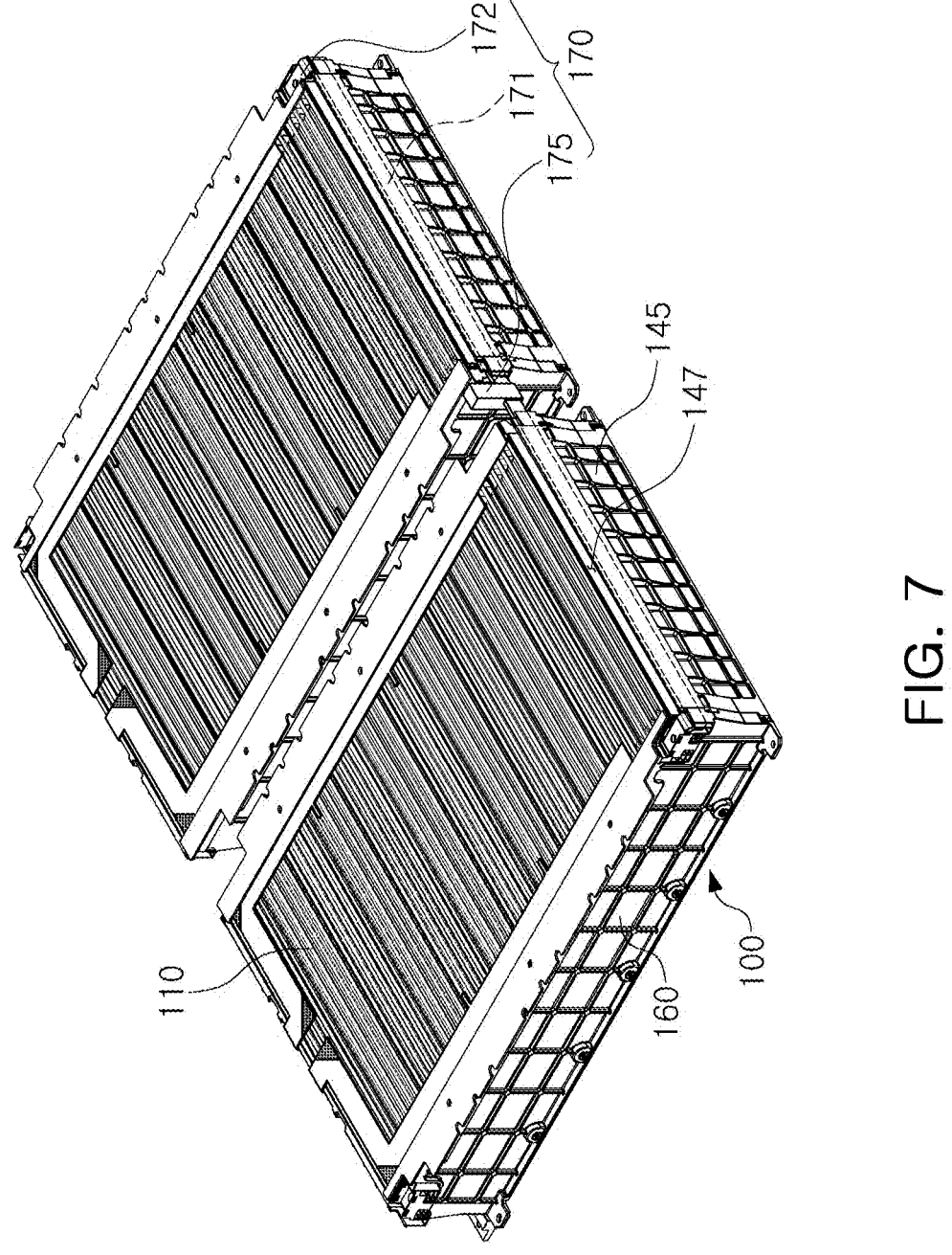
FIG. 7 is an enlarged perspective view of the battery assembly and a linking member in FIG. 4.
Figure 8:
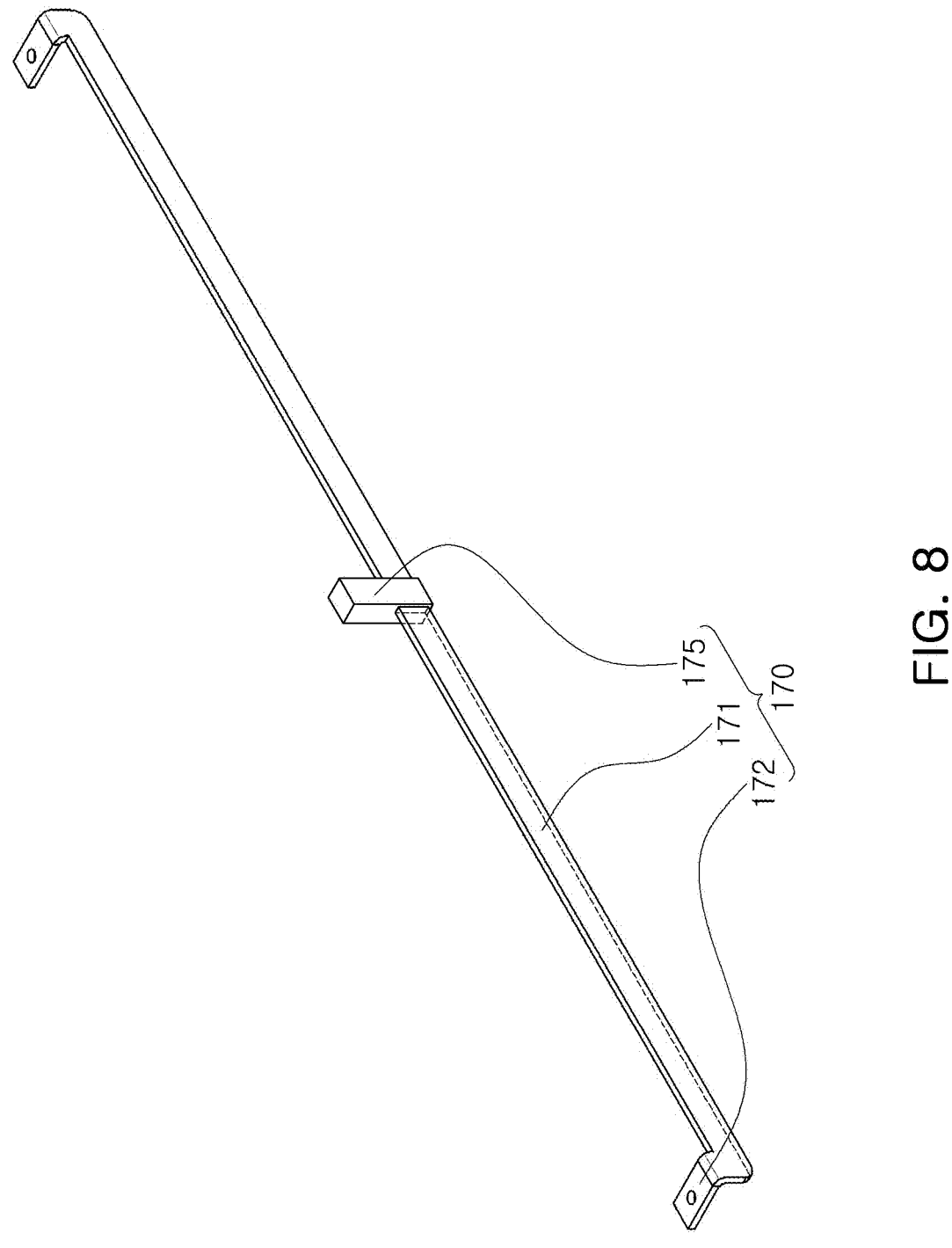
FIG. 8 is an enlarged perspective view of the linking member of FIG. 6.
Figure 9:
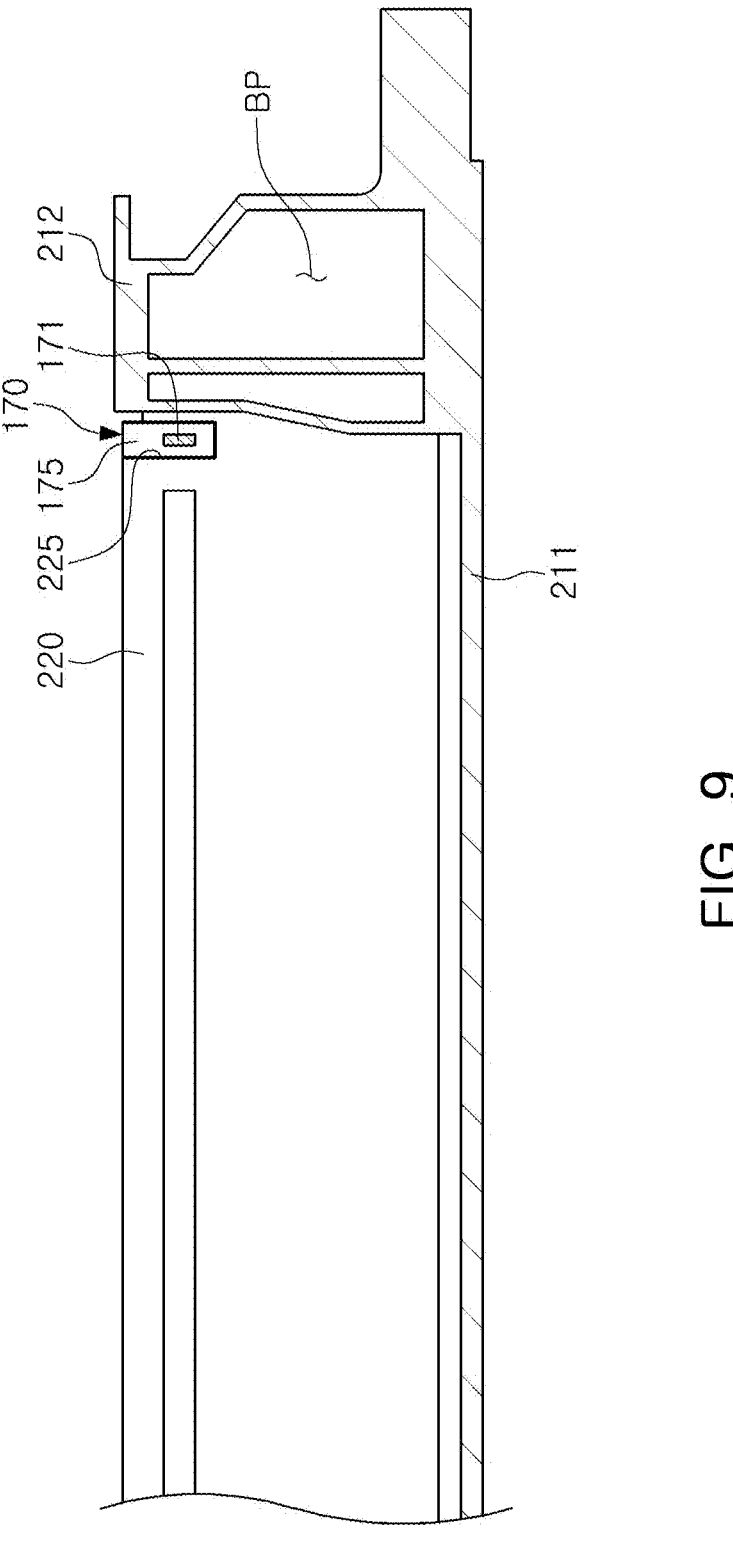
FIG. 9 is a partial cross-sectional view taken along line I-I' in FIG. 4.

Next, a battery pack 200 according to an embodiment of the disclosed technology will be described with reference to FIGS. 4 to 9 together. Also, FIG. 4 is a perspective view of a battery pack having the battery assembly illustrated in FIG. 1, and FIGS. 5 and 6 are partially exploded perspective views of FIG. 4. In addition, FIG. 7 is an enlarged perspective view of the battery assembly and the linking member in FIG. 4, FIG. 8 is an enlarged perspective view of the linking member of FIG. 6, and FIG. 9 is a partial cross-sectional view taken along line I-I' in FIG. 4.

Here, in FIGS. 4 to 9, an upper cover forming an upper surface of the pack housing 210 is omitted so that an internal structure of the battery pack 200 may be easily identified.

The battery pack 200 may include a pack housing 210, a plurality of battery assemblies 100, and a linking member 170.

The pack housing 210 accommodates the plurality of battery assemblies 100 and the linking member 170 therein. To this end, the pack housing 210 may include a sidewall portion 212 forming an internal space and a partition member 220 disposed in the internal space. In addition, the pack housing 210 may include a lower cover 211 covering a lower portion of the internal space and an upper cover (not shown) covering an upper portion of the internal space.

The sidewall portion 212 may include a first sidewall 212a positioned at both ends of the pack housing 210 in a first direction and a second sidewall 212b positioned at both ends of the pack housing 210 in a second direction, perpendicular to the first direction. Also, the first sidewall 212a and the second sidewall 212b are coupled to each other to form four exterior surfaces of the pack housing 210.

The partition member 220 may divide the internal space of the pack housing 210 into a plurality of spaces in which the battery assemblies 100 are accommodated.

Therefore, the battery assembly 100 may be dispersedly disposed in the plurality of internal spaces partitioned by the sidewall portion 212 and the partition member 220, respectively, and may be fixed to the lower cover 211 of the pack housing 210 through the bracket member 160. In this case, in the battery assemblies 100, the first plate 141 or the bracket member 160 may be disposed to face each other and coupled to the pack housing 210.

In addition, the pack housing 210 may have a venting member 230 to discharge gas, flames and/or combustible materials occurring in the battery cells 111 constituting the cell stack 110 externally of the battery pack 200. The venting member 230 may have a structure that is normally closed and may be opened when gas is discharged. However, the venting member 230 may be configured as an open hole formed in the pack housing 210. The installation position and number of the venting member 230 may be variously changed as required.

In some implementations, gas, flames, and/or combustible materials discharged from the cell stack 110 are discharged in an outward direction of the cell stack 110 through the venting hole 142. Accordingly, a venting flow path BP through which gas, flames, and/or combustible materials may move to the venting member 230 may be provided inside the pack housing 210. For example, the venting flow path BP may be formed inside the sidewall portion 212 or inside the partition member 220, or between the pack housing 210 and the battery assemblies 100. Gas and the like introduced into the venting flow path BP may be discharged externally through the venting member 230 provided in the pack housing 210. Accordingly, rapid propagation of flames/heat and resultant secondary damage may be minimized.

When the venting flow path BP is formed between the pack housing 210 and the battery assemblies 100, the bracket member 160 may form part of the venting flow path BP. Accordingly, the bracket member 160 may be formed of a material having heat resistance and fire resistance performance.

For example, the bracket member 160 may be formed of a material such as a metal, a resin, a composite material, or a fiber-reinforced composite material having heat resistance and fire resistance performance and a rigidity of about 0.5 GPa or greater. In addition, the bracket member 160 may be manufactured through post-processing such as heat-resistance and fire-resistance, coating for reinforcing strength and rigidity, heat treatment, and the like.

In addition, the battery pack 200 may include a linking member 170 electrically connecting the dispersedly arranged battery assemblies 100.

The linking member 170 based on an embodiment of the disclosed technology may be disposed to be parallel to the second plate 145 to be coupled to the battery assemblies 100. Specifically, the linking member 170 may include a connection member 171 in contact with the connection terminal 127 of the battery assembly 100 and a spacer member 175 coupled to the connection member 171.

The connection member 171 may be formed in a rod shape, and may be formed of a material having high electrical conductivity, such as copper. Terminal coupling portions 172 coupled to the connection terminal of the battery assembly 100 may be formed at both ends of the connection member 171. The terminal coupling portions 172 may be formed to extend from both ends of the connection member 171 toward the battery assembly 100. For example, the terminal coupling portion 172 may protrude from the connection member 171 in a direction, perpendicular to a length direction of the connection member 171. In addition, since the terminal coupling portion 172 is seated on an upper surface of the connection terminal 127 and is coupled to the connection terminal, the terminal coupling portion 172 may have a size and shape corresponding to the upper surface of the connection terminal 127.

The connection member 171 may be formed in a flat rod shape. The connection member 171 may be coupled to the battery assembly 100 such that a flat, wide surface thereof faces the cell stack 110.

Meanwhile, when the area of the connection member 171 increases along an X-Y plane, the volume of the battery assembly 100 may increase due to the connection member 171, and thus an energy density of the battery pack 200 may decrease. Accordingly, in the linking member 170 based on an embodiment of the disclosed technology, as illustrated in FIG. 6, an area of the connection member 171 in a vertical direction (a Y-Z plane) is greater than an area of the connection member 171 in a horizontal direction (the X-Y plane), to be coupled to the battery assembly 100.

Since the connection member 171 is inserted into the accommodation portion 147 of the second plate 145, the connection member 171 may be disposed to be parallel to the second plate 145.

Since the partition member 220 is disposed between the battery assemblies 100 as described above, the connection member 171 may be disposed to intersect the partition member 220 to electrically connect the battery assemblies 100 installed on both sides of the partition member 220.

To this end, the partition member 220 may have an intersecting recess 225 into which the linking member 170 is inserted, and the linking member may include a spacer member 175 inserted into the intersecting recess 225.

The spacer member 175 is provided in a block form and coupled to the connection member 171 and prevents the connection member 171 from contacting the pack housing 210 or the partition member 220. Therefore, the spacer member 175 may be formed in various shapes as long as it is inserted into the intersecting recess 225 to separate the connection member 171 from the sidewall portion 212 or the partition member 220 by a predetermined distance.

In an embodiment of the disclosed technology, the connection member 171 may pass through the spacer member 175 and be coupled to the spacer member 175. In the present exemplary embodiment, as the connection member 171 is inserted into a through-hole provided in the spacer member 175, the connection member 171 and the spacer member 175 are coupled to each other.

However, a configuration of the spacer member 175 is not limited thereto and the spacer member 175 may be modified in various forms as long as the spacer member 175 separates the connection member 171 from the partition member 220 by a predetermined distance. For example, a recess may be formed in the spacer member 175 and the connection member 171 may be inserted into the recess to couple the connection member 171 and the spacer member 175 to each other. The spacer member 175 may be formed of an insulating material. For example, the spacer member 175 may include at least one of resin, ceramic, and rubber, but is not limited thereto.

The spacer member 175 may be inserted into the intersecting recess 225 of the partition member 220 to be coupled to the partition member 220. Therefore, the spacer member 175 may be firmly fitted into the intersecting recess 225. Accordingly, the connection member 171 may be maintained spaced apart from the partition member by a predetermined distance through the spacer member 175.

In the battery pack 200 configured as described above based on an embodiment of the disclosed technology, the linking member 170 for interconnecting the battery assemblies 100 is accommodated in the accommodation portion 147 provided in the battery assembly 100. Accordingly, there is no need to provide a separate insulating member for insulation between the linking member 170 and the pack housing 210, thereby reducing manufacturing cost and manufacturing time.

In addition, since the linking member 170 is not disposed on the top of the battery assemblies 100, an increase in the thickness of the battery pack 200 due to the linking member 170 may be prevented.

In addition, in the battery assemblies 100 based on an embodiment based on an embodiment of the disclosed technology, separate covers are not coupled to the upper and lower portions of the cell stack 110. As a result, since separate components are not disposed between the cell stack and the pack housing 210, the thickness of the battery pack 200 may be minimized and energy density may be increased.

In an embodiment of the disclosed technology, since the plate unit 140 is coupled only to the side surface of the cell stack 110, a lower surface of the cell stack 110 may be in contact with the lower cover (211 in FIG. 6) of the pack housing 210. Accordingly, heat generated in the battery cell (111 in FIG. 2) may be directly transferred to the lower cover 211 of the pack housing 210, and the heat transferred to the lower cover 211 may be discharged through a cooling unit (not shown) coupled to an outer surface of the lower cover 211. Here, the cooling unit may be a device for emitting heat in an air-cooled or water-cooled manner. In addition, a thermally conductive material such as a thermally conductive adhesive may be interposed between the lower surface of the battery cell 111 and the lower cover 211 in order to improve heat dissipation performance of the battery cell 111.

As set forth above, according to an embodiment of the disclosed technology, since the linking member interconnecting the battery assemblies is accommodated in the accommodation portion provided in the battery assembly, there is no need to provide a separate insulating member for insulation between the linking member and the pack housing, thereby reducing manufacturing cost and manufacturing time. In addition, space utilization of the battery pack may be increased, thereby improving the energy density.

While example exemplary embodiments have been illustrated and described above, various modifications and variations to the described example embodiments and other embodiments could be made based on what is disclosed in the present disclosure.

What is claimed is:

1. A battery pack comprising:
   a plurality of battery assemblies, each of the plurality of battery assemblies including a cell stack that includes a plurality of battery cells stacked together and a plate unit covering at least a portion of a side surface of the cell stack;
   a linking member configured to electrically connect at least two of the battery assemblies; and
   a pack housing including a sidewall portion forming an internal space to accommodate the battery assemblies and the linking member,
   wherein the plate unit includes an accommodation portion into which the linking member is inserted,
   wherein the accommodation portion is arranged in a portion of the plate unit facing the sidewall portion,
   wherein the linking member comprises a connection member disposed to face the side surface of the cell stack and inserted into the accommodation portion,
   wherein a portion of the plate unit is disposed between the connection member and the cell stack to insulate the cell stack from the linking member, and wherein at least a portion of the plate unit is disposed between the connection member and the sidewall portion to insulate the sidewall portion from the linking member.

2. The battery pack of claim 1, wherein the accommodation portion includes a recess exposed to an upper surface of the plate unit.

3. The battery pack of claim 1, wherein
   the linking member includes:
   a terminal coupling portion extending from both ends of the connection member and coupled to a connection terminal of the battery assembly.

4. The battery pack of claim 3, wherein the connection member is formed in a flat rod shape to be inserted into the accommodation portion and includes a first surface that faces the cell stack.

5. The battery pack of claim 3,
   wherein the pack housing includes a partition member dividing the internal space into a plurality of spaces, and the battery assemblies are accommodated in the plurality of spaces respectively.

6. The battery pack of claim 5, wherein the linking member is disposed to cross the partition member, and the partition member includes a crossing recess into which the linking member is inserted.

7. The battery pack of claim 6, wherein
   the linking member further includes a spacer member, wherein
   the spacer member is coupled to the crossing recess to separate the linking member from the partition member by a predetermined distance.

8. The battery pack of claim 7, wherein the spacer member includes an insulating material, and the connection member passes through the spacer member to be coupled to the spacer member.

9. The battery pack of claim 7, wherein the spacer member includes at least one of a resin, a ceramic, a rubber, or a combination of two or more of the resin, the ceramic, and the rubber.

10. The battery pack of claim 1, wherein
    the plate unit includes:
    two first plates coupled to two of four sides of the cell stack and facing each other; and
    two second plates coupled to the other two of the four sides of the cell stack,
    wherein the first plate is disposed to face an electrode lead of the battery cell.

11. The battery pack of claim 10, wherein the two second plates are disposed to be parallel to the battery cells, and the accommodation portion is formed on at least one of the two second plates.

12. The battery pack of claim 10, wherein the plurality of battery assemblies is disposed such that the first plates of adjacent battery assemblies face each other, and the linking member is disposed to be parallel to the second plates.

\* \* \* \* \*